United States Patent [19]

Inoue

[11] Patent Number: 5,090,533
[45] Date of Patent: Feb. 25, 1992

[54] TEMPERATURE-SENSING TYPE FLUID FAN COUPLING DEVICE

[75] Inventor: Hiroshi Inoue, Fuji, Japan

[73] Assignee: Usui Kokusai Sangyo Kaisha Ltd., Shizuoka, Japan

[21] Appl. No.: 620,139

[22] Filed: Nov. 30, 1990

[30] Foreign Application Priority Data

Dec. 1, 1989 [JP] Japan .............................. 1-139827[U]

[51] Int. Cl.⁵ ..................... F16D 35/00; F16D 43/25
[52] U.S. Cl. .................................. 192/58 B; 192/82 T
[58] Field of Search ............. 192/58 B, 82 T; 251/11, 251/78, 303

[56] References Cited

U.S. PATENT DOCUMENTS

| | | | |
|---|---|---|---|
| 669,566 | 3/1901 | Vaudt | 251/303 X |
| 1,366,171 | 1/1921 | Donnelly | 251/303 X |
| 1,743,293 | 1/1930 | Toft | 251/303 X |
| 2,785,837 | 3/1957 | Smith | 251/303 X |
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,215,396 | 11/1965 | Bergsma | 251/11 |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 3,974,844 | 8/1976 | Pimentel | 251/11 X |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,441,598 | 4/1984 | Shepherd | 192/58 B |
| 4,505,367 | 3/1985 | Martin | 192/58 B |
| 4,508,314 | 4/1985 | Hemme | 251/11 |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 4,987,986 | 1/1991 | Kennedy et al. | 192/58 B |

FOREIGN PATENT DOCUMENTS

| | | | |
|---|---|---|---|
| 2364234 | 7/1975 | Fed. Rep. of Germany | 192/58 B |
| 55-76226 | 6/1980 | Japan . | |
| 57-167533 | 10/1982 | Japan . | |
| 57-179431 | 11/1982 | Japan . | |
| 62-124330 | 6/1987 | Japan . | |

Primary Examiner—Rodney H. Bonck
Attorney, Agent, or Firm—Anthony J. Casella; Gerald E. Hespos

[57] ABSTRACT

Disclosed is a temperature-sensing type fluid fan coupling device including: a rotary shaft; a sealing enclosure box having a casing and a cover fitted with a cooling fan; a partition plate partitioning the sealing enclosure box into an oil reserving chamber and a torque transfer chamber accommodating a driving disk; a dam formed in a part of the sealing enclosure box; a circulation passageway leading from the torque transfer chamber to the oil reserving chamber; a valve member fixed to the partition plate, the other end thereof acting to open the hole if an ambient temperature exceeds a set value but close the hole if lower than the set value, the valve interlocking in response to deformations of a temperature-sensing member with variations in temperature; and a torque transfer gap between the driving disk and the confronting wall surface in the vicinity of the cover and the casing, the gap having a oil contact area increased or decreased to control the torque transfer. Based on this construction, a weight member is provided close to the valve member. A plug member assumes a tapered oblique shape to fit in the hole.

9 Claims, 3 Drawing Sheets

PRIOR ART

TEMPERATURE-SENSING TYPE FLUID FAN COUPLING DEVICE

BACKGROUND OF THE INVENTION

1. Field of the Invention

The present invention is directed to an improvement of a temperature-sensing type fluid fan coupling device for supplying the cooling air to an engine in an automobile by automatically controlling a blow-out cooling air quantity upon sensing variations in outside ambient temperature corresponding to a traveling condition in relation to revolutions of a fan for cooling the engine.

2. Description of the Prior Art

The following is a description of an arrangement of a conventional fan coupling device of this type. FIG. 9 shows the principal portion of the device. An outflow adjustment hole (25') bored in a partition hole (25) leads from an oil reserving chamber (26) to a torque transfer chamber (24). The hole (25') is shaped as a straight hole. The outflow adjustment hole (25') is closed by a valve member (28) when an outside temperature exceeds a set value. The valve member (28) acts to interlock with deformations of a temperature-sensing member which are concomitant with variations in temperature. This temperature-sensing member is attached to a front surface of a sealing enclosure box. For this purpose, a front surface of the valve member (28) which confronts the outflow adjustment hole is formed flat. A proximal end of the valve member is secured to the partition plate (25) with a rivet.

The prior art described above, however, presents the following problems. The flat underside of the valve member (28) directly contacts the surface of the outflow adjustment hole (25'). Based on this engagement structure of the planes orthogonal to the biasing direction thereof, inconvenience is often caused in the contact engagement state. Besides, even when the valve member (28) separates slightly from the outflow adjustment hole (25') formed in the partition plate (25), an area of oil passageway in the hole (25'), as illustrated in FIG. 10(B), largely varies as compared with a rate at which the valve member (28) separates therefrom. This results in generation of large transfer torque due to a good deal of oil flowing via the hole (25') into the torque transfer chamber (24). This in turn causes a large increase in the number of revolutions of the fan. The power absorbed largely fluctuates, thereby causing a loss of power. The fan grows in noise, and further a supercooling phenomenon is developed.

SUMMARY OF THE INVENTION

It is a primary object of the present invention, which has been devised in the light of an improvement associated with the prior art, to provide a temperature-sensing type fluid fan coupling device capable of further enhancing product characteristics. The enhancement thereof is attained as follows. A power loss and generation of noises can be minimized by increasing a passageway area in an outflow adjustment hole by a necessary quantity when a slight variation can be seen in a valve member due to variations in outside temperature. Similarly, supercooling can also be prevented. A centrifugal force acting on the valve member is generated more effectively to step up a closing bias. A flow rate control function is stabilized more efficiently.

To accomplish the foregoing object, according to one aspect of the invention, there is provided a temperature-sensing type fluid fan coupling device comprising: a rotary shaft having its top end to which a driving disk is fixed; a sealing enclosure box constructed of a casing and a cover having its outer periphery fitted with a cooling fan, the box being supported through a bearing on the rotary shaft; a partition plate, bored with an oil outflow adjustment hole, for partitioning an interior of the sealing enclosure box into an oil reserving chamber and a torque transfer chamber accommodating the driving disk; a dam formed in a part of an inner peripheral wall surface on the part of the sealing enclosure box which confronts an outer peripheral wall surface of the driving disk in which the oil is accumulated during rotations; a circulation passageway formed in continuation from the dam and leading from the torque transfer chamber to the oil reserving chamber; a valve member positioned on the side of the oil reserving chamber and having its one end fixed onto the partition plate, the other end of the valve member acting to open the outflow adjustment hole of the partition plate when an outside ambient temperature exceeds a set value but close the hole when the ambient temperature is lower than the set value, the valve member being incorporated inside to work interlocking in response to deformations of a temperature-sensing member attached to a front surface of the cover, which deformations are concomitant with variations in temperature; and a torque transfer gap formed between the driving disk and the confronting wall surface outwardly in the vicinity of the cover and the casing, the gap having an effective oil contact area increased or decreased to control the torque transfer from the rotary shaft member to the driven sealing enclosure box, characterized in that a plug member assuming a tapered oblique configuration adaptive to fit in the outflow adjustment hole is provided in a position confronting the outflow adjustment hole, and if necessary, a weight member is provided in the vicinity of the other end of the valve member. The outflow adjustment hole is formed as a tapered hole open to the oil reserving chamber. The outflow adjustment hole has its peripheral portion protruded towards a rear surface as a burring wall. A separate seal member is provided in the peripheral portion of the outflow adjustment hole or on an outer peripheral surface of the plug member. The plug member is composed of an elastic seal member.

This invention based on such a construction is characterized by the weight member provided in the vicinity of the other end of the valve member, a mutual configuration between the outflow adjustment hole and the valve member and a fitting-directional structure in which the valve member is protruded to confront the outflow adjustment hole. Owing to these characteristics, the centrifugal force acting on the valve member during rotations is generated more effectively. The closing bias towards the outflow adjustment hole is promoted. Besides, there is provided a mutually contact engagement structure in the biasing direction. In this structure, the plug member intrudes into the tapered or straight hole defined as the outflow adjustment hole. The plug member engages with the tapered peripheral surface thereof or contacts the peripheral edge portion of the straight hole. This contact engagement structure stabilizes the closing function. The valve member slightly moves with a small rise in the outside temperature due to the weight member and the plug member. At this time, the area of passageway is, as illustrated in FIG. 10(A), slightly enlarged corresponding to the minute movement of the valve member. As a result, an amount of oil flowing into the torque transfer chamber is limited to a necessary quantity, whereby the number of revolutions of the fan increases only by a value required. Hence, the transfer torque slightly increases. It is therefore possible to minimize the power loss and the increase in the fan noises. Supercooling can also be prevented. The flow rate control function can be made sure more efficiently. The product characteristics are further enhanced.

BRIEF DESCRIPTION OF THE DRAWINGS

Other objects and advantages of the present invention will become more apparent during the following discussion taken in conjunction with the accompanying drawings, in which.

DETAILED DESCRIPTION OF THE PREFERRED EMBODIMENTS

Figure 1:
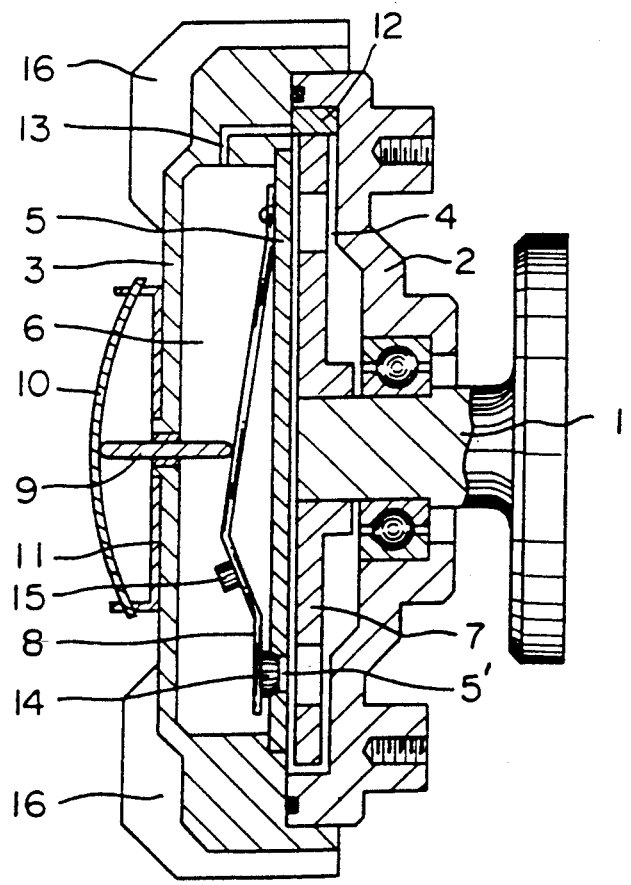
FIG. 1 is a partially cut-away vertical sectional view illustrating a temperature-sensing type fluid fan coupling device in one embodiment of this invention.
Figure 2:
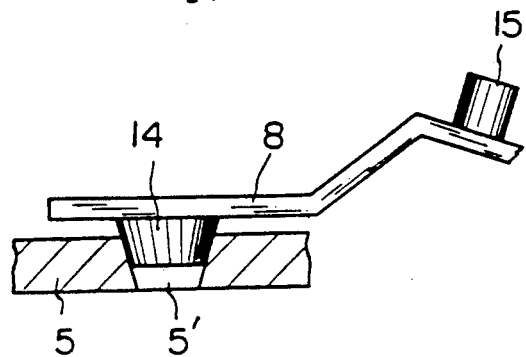
FIG. 2 is a partially cut-away enlarged side elevation illustrating the vicinity of an outflow adjustment hole relative to the principal portion of this invention shown in FIG. 1.

Referring to FIGS. the numeral (1) represents a rotary driving shaft member. A driving disk (7) is fixed to the top end of the rotary shaft member (1). The rotary shaft member (1) supports a sealing enclosure box through a bearing thereon. This box is composed of a casing (2) and a cover (3) having it outer periphery fitted with a cooling fan (not illustrated). A partition plate (5) partitions an interior of the sealing enclosure box into an oil reserving chamber (6) and a torque transfer chamber (4) which accommodates the driving disk (7). The partition plate is formed with an outflow adjustment hole (5') through which the oil flows from the oil reserving chamber (6) into the torque transfer chamber (4). The outflow adjustment hole is a tapered hole (FIGS. 1 through 4) open to the oil reserving chamber (6) or a straight hole (FIGS. 5 through 8). The driving disk (7) in the torque transfer chamber (4) holds a minute gap for transferring the torque between itself and a confronting wall surface of the sealing enclosure box including the partition plate (5) in the vicinity of the external part thereof. Designated at (8) is a valve member for opening and closing the outflow adjustment hole (5'). The valve member (8) located on the side of the oil reserving chamber (6) has its one end fixed with a rivet and the other end positioned in close proximity to the outflow adjustment hole. A support metal fitting (11) is fixed on the front surface of the cover (3). The support metal fitting (11) supports both ends of a temperature-sensing member (10) composed of a tabular bimetal. The valve member (8) is incorporated inside to work through an interlocking rod (9) which interlocks in response to deformations of the temperature-sensing member (10) which are concomitant with variations in outside ambient temperature. A dam (12) is provided on a part of the inner peripheral wall surface of the sealing enclosure box which confronts the outer peripheral wall of the driving disk (7) in which the oil is accumulated during rotations. A pumping function is exhibited by forming a circulation passageway (13). The circulation passageway (13) leads from the torque transfer chamber (4) to the oil reserving chamber (6) in continuation from an inflow port formed on this side in the vicinity of the dam (12) in the rotating direction. Indicated at (14) is a plug member fixedly protruded at the end of the valve member (8) to confront the outflow adjustment hole (5'). The plug member (14) preferably assumes a tapered oblique configuration adaptive to contact-engage with a peripheral surface of the tapered hole constituting the outflow adjustment hole (5') or with a peripheral edge of the straight hole constituting the same. With this arrangement, the plug member (14) is fitted in the outflow adjustment hole (5'). An annular gap is formed between the inner periphery of the outflow adjustment hole (5') and the outer periphery of the plug member (14). This annular gap determines an area of an oil passageway to the torque transfer chamber (4). A weight member (15) is attached in the vicinity of a free end of the valve member (8). The weight member (15) follows up the rotations on the part of the sealing enclosure box, whereby a centrifugal force acts on the valve member (8). The weight member (15) gives a bias to close the outflow adjustment hole (5'), resisting a tensile force of the valve member with the centrifugal force.

A position in which the weight member (15) is attached is properly selectable on condition that the weight member is disposed in the vicinity of the other end of the valve member (8). The position is not limited to those shown in FIGS. 1 through 6.

Figure 3:
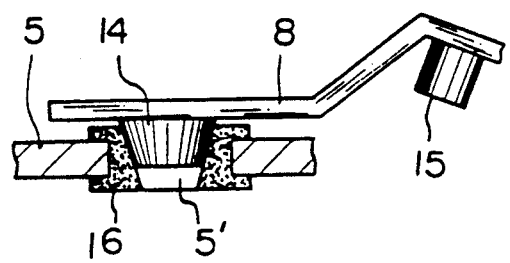
FIGS. 3 through 8 are side elevations similar to FIG. 2, showing other embodiments.
Figure 4:
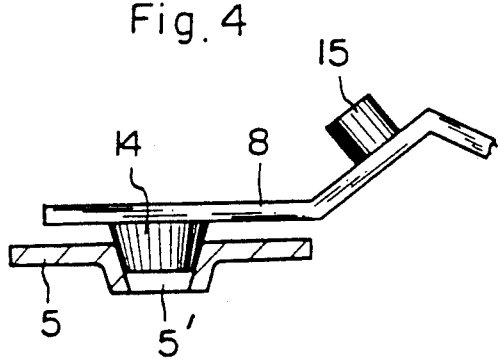
Figure 5:
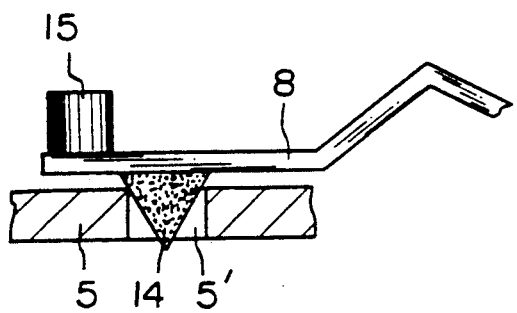
Figure 6:
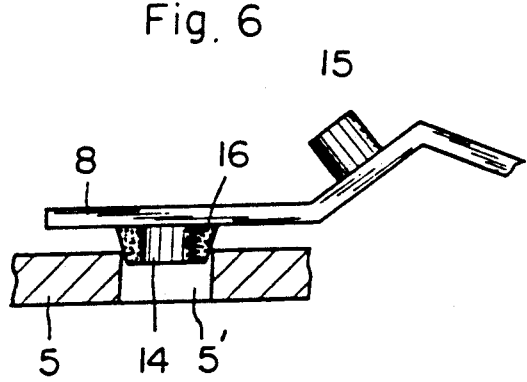
Figure 9:
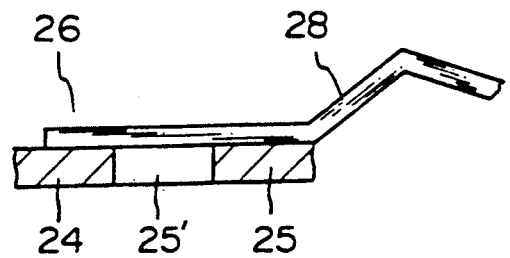
FIG. 9 is a partially cut-away enlarged side elevation depicting the vicinity of an outflow adjustment hole in a conventional example.
Figure 10:
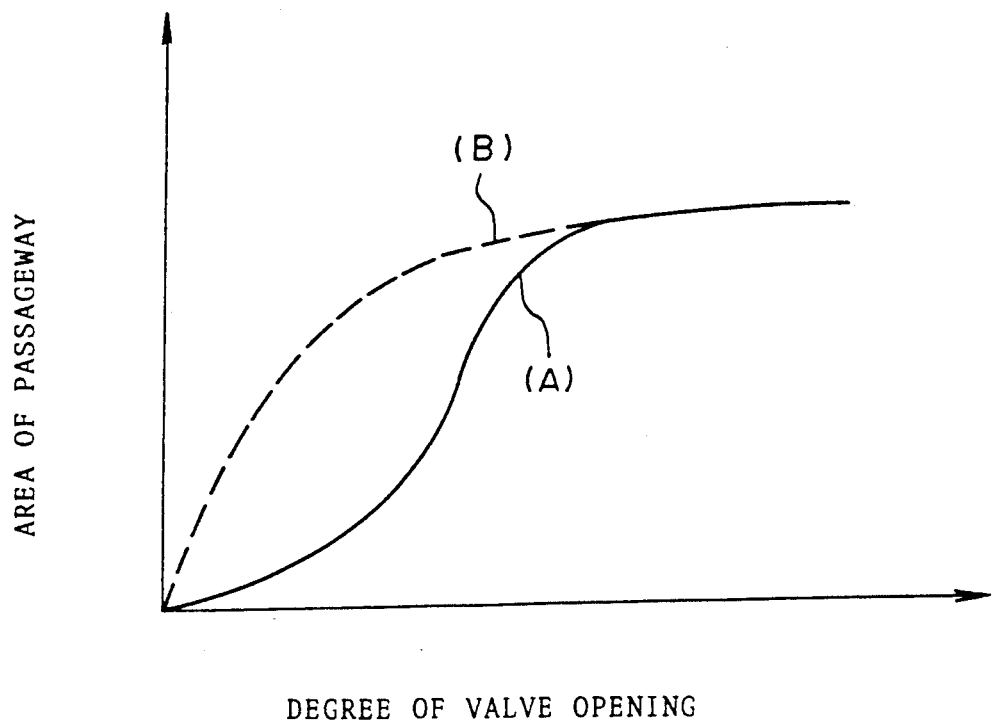
FIG. 10 is a graphic chart showing a relationship between a degree of valve opening and an area of a passageway both in the present invention and in the conventional example.
Figure 7:
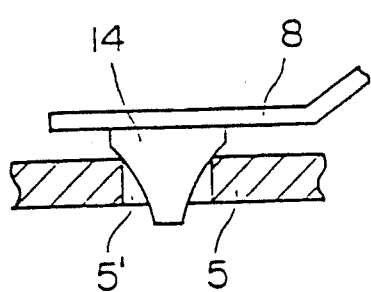
Figure 8:
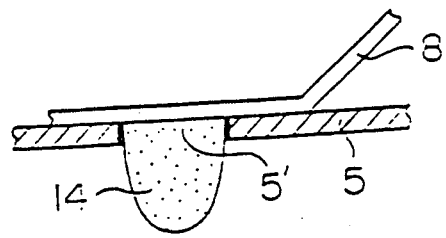

If desired, the outflow adjustment hole (5') may be arranged such that, as illustrated in FIG. 3, a separate elastic seal member (16) formed of rubber or a resinous material is fitted to the peripheral portion of the tapered or straight hole. Another arrangement is that, as depicted in FIG. 6, the elastic seal member (16) is attached to the outer peripheral surface of the plug member (14); or alternatively, as illustrated in FIG. 5, the plug member (14) is composed of an elastic seal member to further improve a sealing effect. The hole peripheral portion may, as depicted in FIG. 4, be protruded towards a rear surface as a burring wall. The present invention is constitutionally applicable to a temperature-sensing type fluid fan coupling device incorporating a labyrinth mechanism. In this labyrinth mechanism, a portion close to the external part of the driving disk (7) radially engages with the confronting wall surface of the sealing closure box.

As discussed above, the temperature-sensing type fluid fan coupling device of this invention includes the outflow adjustment hole (5'), the plug member (14) fixedly protruded to confront the outflow adjustment hole and the weight member (15) attached in close proximity to the other end of the valve member (8). Based on this construction, the centrifugal force acting on the valve member (8) in association with a position of the fixed member fixed onto the partition plate (5) is generated more effectively. This makes it possible to step up the bias for the closing operation of the plug member. Besides, the plug member in the closed state intrudes into the tapered or straight hole, thus contact-engaging with the interior in the biasing direction. The area of the oil passageway to the torque transfer chamber (4) in the outflow adjustment hole (5') can minutely be controlled by virtue of the configuration of the plug member (14) and the weight member (15). Hence, the temperature-sensing type fluid fan coupling device is capable of minimizing an increase in the number of revolutions of the fan which is caused when a good deal of oil flows into the torque transfer chamber (4). The device is also capable of minimizing both a power loss and a rise in fan noises. Besides, the fan coupling device is able to prevent supercooling and control the flow rate at a higher efficiency with a higher stability. The temperature-sensing type fan coupling device is quite useful as a product because of having a capability to further enhance the characteristics thereof.

Although the illustrative embodiments have been described in detail with reference to the accompanying drawings, it is to be understood that the present invention is not limited to those embodiments. Various changes or modifications may be effected therein by one skilled in the art without departing from the scope or spirit of the invention.

I claim:

1. A temperature sensitive fluid fan coupling comprising:
   a closed housing formed with a cover having an outer periphery and a casing having an inner peripheral wall, said cover and said casing being supported on a rotating shaft through bearings, said rotating shaft being provided at an end thereof with a driving disc having an outer peripheral wall, said cover being provided on its outer periphery with a cooling fan, the inside of said closed housing being divided into an oil reservoir and a torque transmitting chamber by a partition plate having an oil outflow adjustment hole extending therethrough, said driving disc being disposed in said torque transmitting chamber;
   a dam formed on a portion of the inner peripheral wall of said casing facing the outer peripheral wall of said driving disc wherein oil is accumulated during the rotation of the fan;
   an oil circulating path being formed between said torque transmitting chamber and said oil reservoir through said dam;
   an elongated valve member disposed in said oil reservoir, an end of said valve member being fixed to said partition plate and another end of said valve member being movable from a first position wherein said oil outflow adjustment hole is closed when an ambient temperature is below a predetermined value to a second position wherein oil may flow through said oil outflow hole when an ambient temperature exceeds a predetermined value, the movement of said valve member being made in response to a temperature sensing means which is deformed by the change of the ambient temperature so that the amount of oil flowing in a torque transmitting gap formed between said driving disc and said partition plate and between said driving disc and the outer portion of said casing is varied with temperature, thereby controlling the torque transmission from said rotating shaft to said closed housing;
   a tapered plug member disposed on the moveable end of said valve member fittable into said oil outflow adjustment hole, said plug member having a trapezoidal shaped cross-section; and
   a weight member disposed on said valve member adjacent the movable end thereof for biasing said valve member with centrifugal force.

2. The device as set forth in claim 1, wherein said outflow adjustment hole is formed as a tapered hole open to said oil reserving chamber.

3. The device as set forth in claim 1, wherein a portion of the partition plate forming the periphery of said outflow adjustment hole protrudes outwardly into said torque transmitting chamber as a burring wall.

4. The device as set forth in claim 1, wherein a separate elastomeric seal member is fitted to the periphery of said outflow adjustment hole, said seal member having a tapered aperture extending therethrough for sealingly engaging the tapered plug member.

5. The device as set forth in claim 1, wherein said plug member is composed of an elastic material.

6. The device as in claim 1, wherein a separate seal member is mounted on an outer peripheral surface of said plug member.

7. A temperature sensitive fluid fan coupling comprising:
   a rotating shaft having opposed front and rear ends;
   a drive disk rigidly fixed to the front end of said shaft and having an outer peripheral surface;
   a closed housing including a cover and a casing defining an inside therebetween, said housing being supported on said shaft by a bearing such that said drive disk is disposed within said housing such that a gap is defined between the housing and the drive disk;
   a generally circular partition plate which partitions the inside of said housing into an oil reservoir chamber and a torque transmission chamber containing said drive disk, said partition plate having an outer periphery and having an outflow-adjusting hole that adjusts the flow of oil between said oil reservoir chamber and said torque transmission chamber, said outflow-adjusting hole being disposed adjacent to the periphery of said partition plate;
   a dam formed in a part of the inner wall surface of the housing which is opposite to the outer peripheral surface of said drive disk and on which oil collects during rotation;
   a circulating passage communicating with said dam and extending from said torque transmission chamber to said oil reservoir chamber;
   a temperature-sensing member mounted on said housing being and deformable with changes in ambient temperature;
   an elongated resilient valve member disposed in said oil reservoir chamber and having one end thereof fixed to said partition plate with the opposed end being free and disposed adjacent to said outflow adjustment hole, said valve member interlocking with said deforming temperature-sensing member for opening said outflow-adjustment hole when ambient temperature exceeds a preset value and for closing said outflow-adjustment hole when ambient temperature is below the preset value, said valve member being angled away from said partition plate;
   a weight member disposed on said valve member adjacent to the free end thereof for biasing the free end of said valve member toward said outflow adjustment hole with centrifugal force; and a tapered plug member disposed on said valve member adjacent the free end thereof for engaging said outflow adjustment hole when centrifugal force biases the free end of said valve member so as to gradually close the outflow adjustment hole in such a manner as to make the area of closure gradually reduced until said tapered plug member enages entirely in said outflow adjustment hole.

8. The fan fluid coupling of claim 7, wherein an elatomeric seal member is disposed on said tapered plug member for sealingly engaging said outflow adjustment hole.

9. The fan fluid coupling of claim 7, wherein an elastomeric seal member is fitted to the peripheral wall of said outflow-adjustment hole, said seal member having a tapered aperture extending therethrough for sealingly engaging said tapered plug member.

* * * * *